March 27, 1962  J. F. KOHLWEY  3,026,564
APPARATUS FOR THE CONTINUOUS MANUFACTURE OF
SHAPED ARTICLES FROM ARTIFICIAL
THERMOPLASTIC SUBSTANCES
Filed Oct. 27, 1958
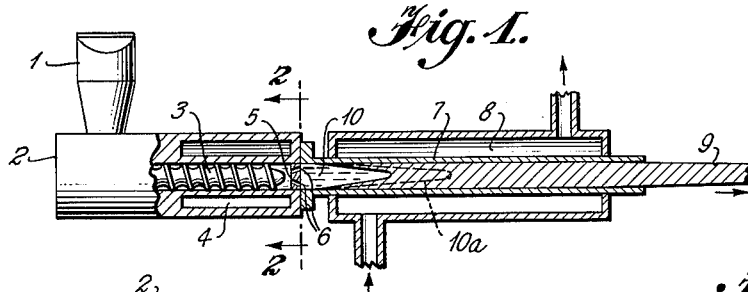
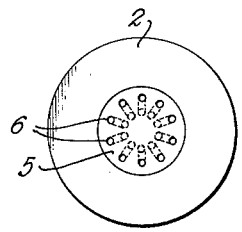
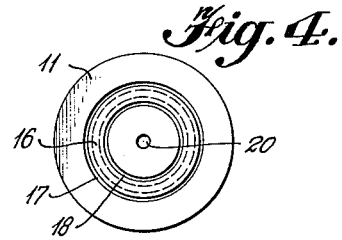
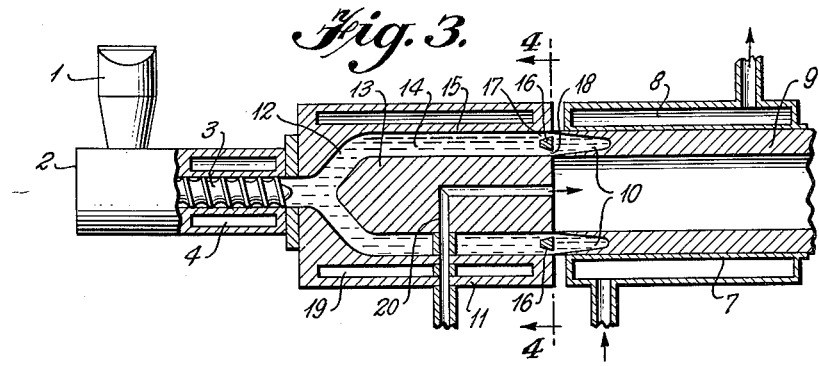
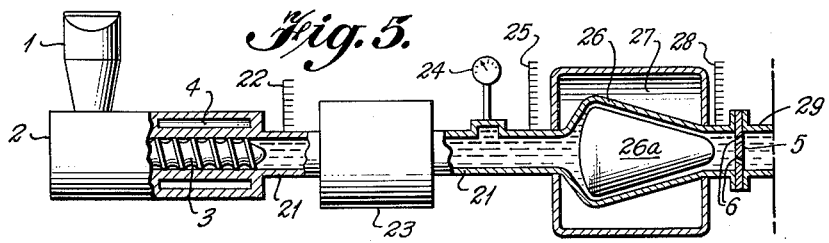
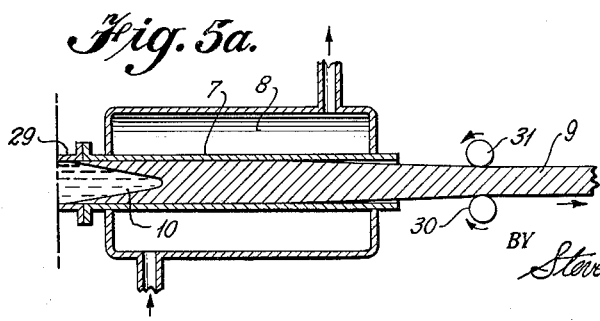
INVENTOR
Johann Friedrich Kohlwey
BY Stevens, Davis, Miller & Mosher
ATTORNEYS

United States Patent Office 3,026,564
Patented Mar. 27, 1962

3,026,564
APPARATUS FOR THE CONTINUOUS MANUFACTURE OF SHAPED ARTICLES FROM ARTIFICIAL THERMOPLASTIC SUBSTANCES
Johann Friedrich Kohlwey, Velp, Gelderland, Netherlands, assignor to Algemene Kunstzijde Unie, N.V., Arnhem, Netherlands, a corporation of the Netherlands
Filed Oct. 27, 1958, Ser. No. 769,780
Claims priority, application Netherlands Nov. 22, 1957
7 Claims. (Cl. 18—12)

The invention relates to an apparatus for the continuous manufacture of bars, solid and hollow profiles, tubes, and the like elongated articles from artificial thermoplastic substances, the thermoplastic substance in the plasticized or molten state being forced into a cooled molding device from which it is discharged after solidification.

Such processes are generally known. In the continuous manufacture of a cylindrical bar according to these processes, the thermoplastic substance in the plasticized or molten state is forced through a round opening into for instance a cooled tube, and the solidified molded bar is drawn out of this tube or is discharged therefrom otherwise.

In the continuous manufacture of a cylindrical tube according to these processes, the artificial thermoplastic substance in the plasticized or molten state is forced through a ring-shaped slit into a cooled tube while being cooled internally, for instance by means of a gaseous medium.

It has been discovered that in these prior processes the amount of artificial thermoplastic substance supplied per unit time to the molding device must be kept relatively low. This implies also that the speed at which the shaped objects leave the molding device is relatively low. The fact is that if the supply of artificial thermoplastic substance is increased, the molded objects show voids in consequence of the shrinking of the material during cooling. These voids caused by shrinkage of the molded objects occur in particular in the manufacture of bars of a relatively large diameter, e.g. exceeding 5 cm., or tubes of a large wall-thickness, e.g. 1 cm. or more.

The present invention therefore has as its principal object the provision of apparatus by which the manufacture of shaped articles of the kind hereinbefore indicated can be accomplished in a manner as to eliminate or substantially eliminate the occurrence of these voids in the final shaped article.

It has now been discovered that the speed at which the shaped objects leave the molding device can be increased without the molded objects showing these objectionable voids.

The present invention is based on carrying out the same general process of the previously known type mentioned in the foregoing discussion, but with the modification that the molten or plasticized thermoplastic material is supplied to the rod- or other profile-forming portion of the system along or adjacent the wall of the cooling device.

The above-mentioned results apparently may be ascribed to the fact that in the arrangement according to the present invention the cone of molten thermoplastic material, i.e. the amount of thermoplastic substance still present in the plasticized, still-unsolidified state in the shaping object, is more abruptly rounded off than the cones that can be observed in the practice of the known processes. This rounder shaped facilitates an easier flow of the melt up to the extremity of the non-solidified mass than is the case with the longer and more slender cones which, as mentioned above, occur when the plasticized substance is supplied to the shaping object at a speed which is practically uniform over the whole cross-section of the object. In consequence of this facilitated flow, the space which on cooling would normally tend to become vacant in the object owing to contraction, with greater certainty fills up completely with molten thermoplastic substance, as a result of which the formation of voids is avoided.

In the manufacture of bars and solid profiles in which the thermoplastic substance in the plasticized or molten state is forced into a cooled molding device, this improved flow is realized in practice by feeding the thermoplastic substance to the cooling zone mainly along the cooled wall of the molding device.

In the manufacture of hollow profiles and tubes in which the thermoplastic substance in the plasticized or molten state is forced through a slit with endless cross-sectional area (i.e., a substantially continuous slit) into a cooled molding device, this can be attained in practice by feeding the thermoplastic substance to the cooling zone through and along the walls of the slit to the cooled wall of the molding device.

For obtaining the effect described above, the apparatus for the manufacture of bars, hollow and solid profiles, tubes, and the like elongated articles from artificial thermoplastic substances according to the present invention, comprising a heatable feeding device and a connected cooling device, is provided with a connection between the feeding device and the molding and cooling device which ensures that the artificial thermoplastic substance, supplied by the feeding device, is supplied to the shaping object mainly along the boundary surfaces of this object.

This part may have different shapes depending upon the nature of the shaped objects to be manufactured.

In the manufacture of solid profiles this part may preferably take the form of an accurately fitting plate situated in the passage between the feeding device and the molding and cooling device, but in which one or more runners or passages are provided, of which the gates or exit ports are positioned near the wall of the molding device. These runners or passages may be truly axial, or they may diverge in the direction of flow. Consequently on employing the latter arrangement the thermoplastic substance is displaced from the center outwardly. This promotes the flowing of the plasticized substance along the wall of the molding device, which under normal operating conditions is suitably cooled.

In the manufacture of solid profiles, the required flow can also be effected with the aid of suitable inserts that block the central part of the flow passage and thus positively direct the flow of the molten artificial thermoplastic substance against and along the wall of the molding and cooling device.

In the manufacture of hollow profiles and tubes in which the passage between the feeding device and the molding device is in the form of a ring-shaped slit, the part concerned may be a plate-shaped ring or annulus fitting exactly in the passage and provided with two series of runners or passages, the gates or exit ports of one series of runners or passages being positioned near the outer wall of the pressing slit through which the molten artificial thermoplastic substance is forced and the gates of the other series of runners or passages being positioned near the internal boundary of the pressing slit. Here, too, the runners or passages may either remain parallel or diverge in the direction of flow. Instead of a thus-formed ring in the ring-shaped pressing slit, a ring-shaped insert may be provided in the pressing slit, leaving spaces between this insert and the two walls of the pressing slit.

This arrangement ensures that the artificial thermoplastic substance supplied by the feeding device enters the molding device and flows along the cooled boundary surfaces of the shaped object being molded.

The apparatus elements mentioned above may be either removably located in the passage between the feeding device and the molding device, or they may form an entity with the walls of this passage.

It may be remarked that apparatus for the manufacture of bars, solid and hollow profiles, tubes, and the like shaped objects is already known in which artificial thermoplastic substances such as synthetic linear polyamides, polyesters and polythenes in the molten or plasticized state are forced out continuously by an extrusion machine and, via a supply line containing a pressure- and temperature-regulating device for the melt, fed into a cooled molding device, the solidified shaped objects thereupon being continuously taken out of the molding device.

In using such an apparatus, however, the difficulty is encountered that during cooling the thermoplastic material sticks somewhat in the molding and cooling device. It has already been proposed that this sticking can be prevented by providing between the supply line and the molding device a link or connecting piece of a thermal-insulating material, such as glass, polytetrafluorethylene, asbestos products, etc., and that proposal forms the basis of the method described and claimed in the prior copending U.S. application Serial No. 478,816, filed December 30, 1954, by Robert Levison and Jan Lodewijk Voigt, now U.S. Patent No. 2,867,004. In using that method for the manufacture of bars, solid and hollow profiles, tubes, and the like shaped objects from artificial thermoplastic substances, the speed at which the shaped objects are pulled out of the molding and cooling device can be increased without the molded objects showing voids.

According to the present invention, in such apparatus for the continuous manufacture of bars and solid profiles from synthetic thermoplastic substances such as synthetic linear polyamides, polyesters and polythenes, said apparatus comprising an extrusion machine connected to a cooled molding device by means of a supply line containing a pressure- and temperature-regulating device, a link or connecting piece manufactured from a thermal-insulating material, and pulling-off rollers for drawing the molded object out of the molding and cooling device under tension, there is the further feature of an insert, positioned between the supply line and the link, which is provided with one or more runners or passages ending on or near the peripheral surface of the link.

If such apparatus is to be employed for the manufacture of tubes and hollow profiles, this insert moreover is also provided with runners or passages ending at or near the inner surface of the die or molding device.

In order to indicate still more fully the nature of the present invention, the following typical procedure is set forth in conjunction with a description of the apparatus shown in the accompanying drawing, it being understood that this description is here presented by way of illustration only and not as limiting the scope of the invention. Like elements have been given the same reference numerals throughout the various figures.

In the drawing,

FIGURE 1 schematically represents an embodiment of the apparatus for the manufacture of bars and profiles;

FIG. 2 is an enlarged sectional view of the apparatus along the section 2—2 in FIG. 1;

FIG. 3 schematically represents another embodiment of the apparatus adapted for the manufacture of tubes;

FIG. 4 is a sectional view of the apparatus along the section 4—4 in FIG. 3; and FIGS. 5 and 5a together schematically represent another embodiment of the apparatus for the manufacture of bars and solid profiles from thermoplastic substances having a narrow melting range, this particular embodiment illustrating the application of the present invention to the overall system described and claimed in the aforesaid prior copending U.S. application of Robert Levison and Jan Lodewijk Voigt the disclosure of which is incorporated herein by reference.

In FIG. 1, 1 denotes a hopper for feeding granular artificial thermoplastic material into an extrusion machine 2, wherein a worm screw 3 is present which conveys the granules to a zone where the granules are converted into a plasticized or molten condition, e.g. melted. The required heat is supplied through a concentrically-disposed channel 4 through which a suitable heating medium flows. However, the heating may also be effected in any other known way.

The molten thermoplastic material is forced through perforations 6, present near the peripheral surface of a plate 5, into a cylindrical molding device 7. This molding device is cooled by a suitable cooling liquid flowing through a cooling jacket 8. The cooled molded rod 9 is forced out of the molding device by means of the pressure on the melt applied by means of the extrusion machine 2.

In consequence of the fact that the perforations 6 are located near the circumference of the plate 5, the melt at the entrance of the molding device 7 is supplied along and immediately adjacent the cooled wall of the latter. This results in a rapid cooling of the melt at the entrance of the molding and cooling device 7.

Experiments have shown that the cone 10 formed in this way is relatively short and rounded off.

When the perforated plate 5 was absent, a relatively long melt cone was formed, ending in a relatively sharp point (dotted line 10a).

If the amount of molten thermoplastic material which per unit time is fed to the molding device is increased, the point of the melt cone is displaced to the right. If the perforated plate 5 is not present, for a given amount of material the melt cone becomes so long and its point so sharp that shrinkage of the thermoplastic material owing to the cooling gives rise to voids near the extremity of the solidification cone. When the perforated plate 5 is present, however, the more rounded extremity of the solidification cone, upon feeding the same increased amount of thermoplastic material per unit time, is also displaced to the right, but to a lesser degree. Consequently, no voids occur near the extremity of the solidification cone.

In the arrangement according to FIG. 3, a link or connecting piece 11 is provided between the extrusion machine 2 and the molding device 7. In this link 11 a runner or passage 12 is provided, which diverges from the extrusion machine 2 to the molding device 7. In the wide part of the runner or passage a cone 13 is fitted by means of suitable supports (not shown), this cone having such a diameter as to leave a ring-shaped space 14 between the cone 13 and the runner wall 15. At the end of the ring-shaped space 14 a ring or annulus 16 is provided, also with the aid of supports (not shown). The dimensions of this ring 16 are such as to leave two small slits 17 and 18 between the ring 16 and the runner wall 15, and between ring 16 and the cone 13, respectively. The link 11 is provided with a suitable heating jacket 19.

With this arrangement, a molten thermoplastic substance which is supplied by the extrusion press 2, is forced through the ring-shaped slits 17 and 18 into the cylindrical molding device 7, which is cooled by a suitable cooling liquid flowing through the cooling jacket 8. The inner wall of the melt thus extruded in tubular form is cooled by means of a suitable inert or other gaseous medium which is supplied via duct 20. An inert gas such as nitrogen is particularly suitable in view of the elevated temperatures of the molten artificial thermoplastic substance undergoing the shaping operation.

Owing to the fact that the slits 17 and 18 are narrow, the melt supplied to the cooled molding device 7 flows along the runner wall 15 and the surface of the cone 13. In this way a rapid cooling of the melt is obtained as it enters the molding device. Here again, experiments have shown that the solidification "cone" 10 (non-shaded part) is short and rounded off. This is here referred to as "cone" 10 simply for convenience although it is not really a cone in view of the annular shape of the thermoplastic material at this point. However, its cross-section has essentially the same shape as the cross-section of the true cone 10 of FIG. 1 and hence the name "cone" is retained here for brevity and convenience.

In the arrangement of FIGS. 5–5a, the molten thermoplastic material is forced by the extrusion machine 2 into a duct 21. At the entrance of the duct 21 the temperature of the molten thermoplastic material is checked by means of a thermometer 22 showing the wall temperature of the duct 21.

After the thermometer 22 a suitable pressure-regulating device 23 is provided in the duct 21. The pressure in the duct 21 is measured by means of a suitable measuring device or gauge 24. From the duct 21 the molten thermoplastic material, the temperature of which can be read with the aid of a thermometer 25, enters a tempering device 26 surrounded by a heat exchange jacket 27 and provided with a torpedo 26a by means of which the molten thermoplastic material is spread out in the form of a relatively thin film as it flows through the tempering device 26. By means of this tempering device 26 the thermoplastic material is accurately adjusted to the desired temperature.

The temperature of the molten thermoplastic material is measured before and after its passage through the tempering device by means of the thermometers 25 and 28, respectively. Here again the wall temperature is measured. The thermometers 22, 25 and 28, as well as the presssure measuring device 24, may if desired be automatic recording devices per se well known in the art.

After leaving the tempering device 26 the molten thermoplastic material is conveyed via plate 5, which is provided with perforation 6 near the circumference, into a tubular connecting piece 29 made of e.g. thermal-insulating asbestos material. After the tubular connecting piece 29 there is disposed a cylindrical molding device 7, which is cooled by a suitable cooling liquid flowing through jacket 8. The solidified bar 9 is drawn out of the molding device 7 by means of the positively driven rollers 30 and 31. The diameter of the bar 9 leaving the molding device 7 is slightly smaller than the diameter of the molding device owing to solidification shrinkage.

In manufacturing cylindrical bars from poly-ε-aminocaproic acid the temperatures at the thermometers 22, 25, 28 were in general 260°, 280° and 265° C. respectively. The pressure ahead of the tempering device 26, suitably adjusted by means of the pressure-regulating device 23, depends on the thickness of the bar to be manufactured.

The cooling water in the cooling jacket 8 was generally kept at about 20° C.

The following table shows the pressures that were employed in the manufacture of cylindrical bars of various diameters. The table also includes the maximum output of bars which were free from voids, both with and without application of the perforated plate 5.

| Diameter of bar, mm. | Pressure, atm. | Maximum weight of bars without voids manufactured per hour | |
|---|---|---|---|
| | | With plate 5, kg. | Without plate 5, kg. |
| 65 | 15 | 4.5 | 3.6 |
| 100 | 18 | 6.0 | 4.1 |
| 125 | 20 | 7.1 | 4.2 |

This table clearly shows that the presence of the perforated plate 5 leads to a considerably higher output of void-free bars per hour.

While specific examples of preferred methods and apparatus embodying the present invention have been described above, it will be apparent that many changes and modifications may be made in the details of the methods of procedure and the apparatus without departing from the spirit of invention. It will therefore be understood that the examples cited and the particular methods of procedure and details of apparatus set forth above are intended to be illustrative only, and are not intended to limit the scope of the invention.

What is claimed is:

1. An apparatus for the continuous manufacture of elongated shaped thremoplastic objects by a process wherein a heated artificial thermoplastic substance in the plasticized or molten state is forced into a cooled molding device and the solidified object is drawn out of the molding device, the combination of a heatable feeding device for the artificial thermoplastic substance; a connecting molding device equipped with a cooling device; and means located between the feeding device and the cooled molding device and immediately adjacent the latter for defining a region of relatively restricted cross-section through which the heated artificial thermoplastic substance is supplied through said region of relatively restricted cross-section from the feeding device to the shaping thermoplastic object exclusively along the boundary surfaces of said object as it is being formed near the entrance to the cooling device.

2. An apparatus as defined in claim 1, wherein said means located between the feeding device and the molding device is provided with a plurality of passages of relatively restricted cross-section terminating near a cooled wall of the molding device.

3. An apparatus as defined in claim 2, wherein said means located between the feeding device and the molding device is a plate perforated near its circumference.

4. An apparatus for the continuous manufacture of elongated shaped thermoplastic objects by a process wherein a heated artificial thermoplastic substance in the plasticized or molten state is forced into a cooled molding device and the solidified object is drawn out of the molding device, the combination of a heatable feeding device for the artificial thermoplastic substance, a connecting molding device equipped with a cooling device, and means located between the heatable feeding device and the molding device and located immediately adjacent the latter for supplying the artificial thermoplastic substance from the feeding device, said means including means defining a substantially continuous slit and further including a plate-shaped ring exactly fitting in the passage between the feeding device and the molding device and being provided with two series of passages, the gates or discharge ports of one series of passages being positioned near the outer wall of the slit and the gates or discharge ports of the other series of passages being positioned near the internal boundary of the slit.

5. An apparatus as defined in claim 4, wherein a ring-shaped insert is provided in said slit, leaving spaces between this insert and the two walls of the slit.

6. An apparatus as defined in claim 1 wherein the insert is a circular plate so constructed and arranged as to define a passage for the heated thermoplastic substance that is of relatively restricted cross-section between the circumference of the plate and the inside of the supply line within which it is situated.

7. An apparatus as defined in claim 1 wherein the insert is a plate closing the supply line, said plate having bores which diverge in the direction of the molding device, the outlets of said bores being near the periphery of the plate.

References Cited in the file of this patent

UNITED STATES PATENTS

| | | |
|---|---|---|
| 2,217,135 | Parrish et al. | Oct. 8, 1940 |
| 2,719,330 | Stott | Oct. 4, 1955 |
| 2,736,057 | Davis et al. | Feb. 28, 1956 |
| 2,747,222 | Koch et al. | May 29, 1956 |
| 2,747,224 | Koch et al. | May 29, 1956 |
| 2,747,226 | Schnitzius et al. | May 29, 1956 |
| 2,867,004 | Levison et al. | Jan. 6, 1959 |